United States Patent [19]

Upadhya

[11] Patent Number: 4,988,534
[45] Date of Patent: Jan. 29, 1991

[54] TITANIUM CARBIDE COATING OF BEARING COMPONENTS

[75] Inventor: Kamleshwar Upadhya, Glendale, Wis.

[73] Assignee: General Electric Company, Milwaukee, Wis.

[21] Appl. No.: 467,910

[22] Filed: Jan. 22, 1990

Related U.S. Application Data

[62] Division of Ser. No. 331,508, Mar. 31, 1989.

[51] Int. Cl.$^5$ .............................................. B05D 3/06
[52] U.S. Cl. ..................................... 427/38; 427/307
[58] Field of Search ................................. 427/38, 307

[56] References Cited

U.S. PATENT DOCUMENTS 3,988,955 11/1976 Engel et al. ............................ 427/38
4,468,309 8/1984 White ..................................... 427/38
4,707,238 11/1987 Okubo .................................... 427/38

FOREIGN PATENT DOCUMENTS 63-20444 1/1988 Japan .................................... 427/38

Primary Examiner—Stanley Silverman
Attorney, Agent, or Firm—Quarles & Brady

[57] ABSTRACT

A bearing retainer for mounting for a bearing in an x-ray tube, the x-ray tube having a rotating anode supported on an anode shaft held within a hollow anode stem, the retainer being slidably fitted into a hollow anode stem to hold one bearing coaxially with the anode shaft and to permit axial motion of the bearing so held, where the sliding surface of the bearing retainer is coated with titanium carbide, and wherein the bearing retainer includes a bearing flange not coated with titanium carbide which may be swaged around the outer race of the bearing to hold the bearing.

3 Claims, 4 Drawing Sheets

TITANIUM CARBIDE COATING OF BEARING COMPONENTS

BACKGROUND OF THE INVENTION

This is a division of application Ser. No. 07/331,508, filed Mar. 31, 1989.

This invention relates to X-ray tubes having rotating anodes and more particularly to a retainer for supporting the bearings used in X-ray tubes.

A principal component of conventional X-ray equipment and computed tomography (CT) equipment is an X-ray tube which provides the source of X-rays Such tubes contain a vacuum at $10^{-8}$ to $10^{-9}$ torr and operate by accelerating a stream of electrons from a heated cathode through a high voltage against a target anode. The conversion efficiencies of such tubes are low and therefore considerable heat is generated in the anode as a by-product of the x-rays generation.

In order to reduce heat concentration in the anode, the anode is rotated at speeds up to 10,000 RPM thereby continuously presenting the cathode a new and cooler surface. In a high performance x-ray tube, the surface of the anode may reach temperatures of 3200° C., and areas of the anode outside the immediate target surface may rise to temperatures of approximately 1300° C.

Much of the heat generated in the anode is radiated through the glass walls of the tube from high emissivity anode coatings Even so the anode shaft and support bearings or which the anode rotates, may rise to temperatures of up to 450° C. It should be noted that the anode shaft and bearings are contained within the evacuated x-ray tube envelope.

To prolong bearing life it is generally known to preload the bearings supporting the anode shaft. Typically, a front bearing is held fixed with respect to the anode stem and the rear bearing's outer race is held in a retainer that is free to slide axially within a hollow anode stem. The rear bearing's inner race 46 is affixed to the anode shaft A preload spring applies an axial force to the rear retainer to provide preloading to both bearings. The preloading force improves the tracking of the bearing ball sandwiched between the inner and outer races of both front and rear bearings, increasing bearing life and reducing bearing noise.

To prevent excessive radial play in the anode shaft, the sliding bearing retainer holding the rear bearing must fit closely within the guiding anode stem. The close fit between the bearing retainer and the anode stem raises a number of problems including that of friction between the sliding surface of the retainer and the anode stem altering the bearing preload, wear between the sliding surfaces which may increase the radial play in the anode shaft, and the generation of "wear" particles which may contaminate the bearing causing increased bearing noise and wear. Bearing noise is thought to arise in part from particulate matter either from foreign substances incorporated into the bearing during the bearing manufacture or particles shed from the bearings themselves or other sliding tube components.

The combined effect of high rotational speed, high operating temperatures and a vacuum environment places severe demands on the anode support bearings. Accordingly, bearing failure is the chief limit to x-ray tube life. Such failure may result either from bearing "freeze", a seizure of the rolling elements of the bearing within their races, or from material transfer from the anode stem to the bearing retainer hindering the sliding motion between the stem and retainer surfaces, or from an increase in bearing noise which may necessitate tube replacement despite otherwise acceptable operation.

The extreme operation temperatures and high vacuum environment to which the retainer and anode stem are subjected prevents the use of conventional organic lubricants in this application.

SUMMARY OF THE INVENTION

In the present inventiOn, one of the bearings supporting the rotating anode shaft of an x-ray tube is held in a retainer which slides within a hollow anode stem. The outer sliding surface of a bearing retainer is coated with a thin ceramic lubricating layer. This ceramic layer provides a surface that reduces wear between the sliding bearing retainer and the inside of the anode stem.

It is a general object of the invention to provide a lubrication means suitable to the environment of an x-ray tube to reduce wear between the sliding bearing retainer and the supporting anode stem.

The ceramic coating is applied by means of plasma assisted physical vapor deposition. This technique allows application of a smooth and uniform coating at relatively low temperature, preventing distortion of the retainer that would accompany higher temperature processing.

Accordingly another object of the invention is to produce a lubricated retainer with high dimensional accuracy.

The bearing sleeve includes a bearing retainer flange which is deformable to be swaged over the bearing to hold the outer bearing race positively with respect to the retainer. This flange is masked during the coating of the retainer with ceramic so as to prevent exfoliation of ceramic particles during the swaging process.

Another object of the invention is to reduce the introduction of particles to the bearing assembly.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
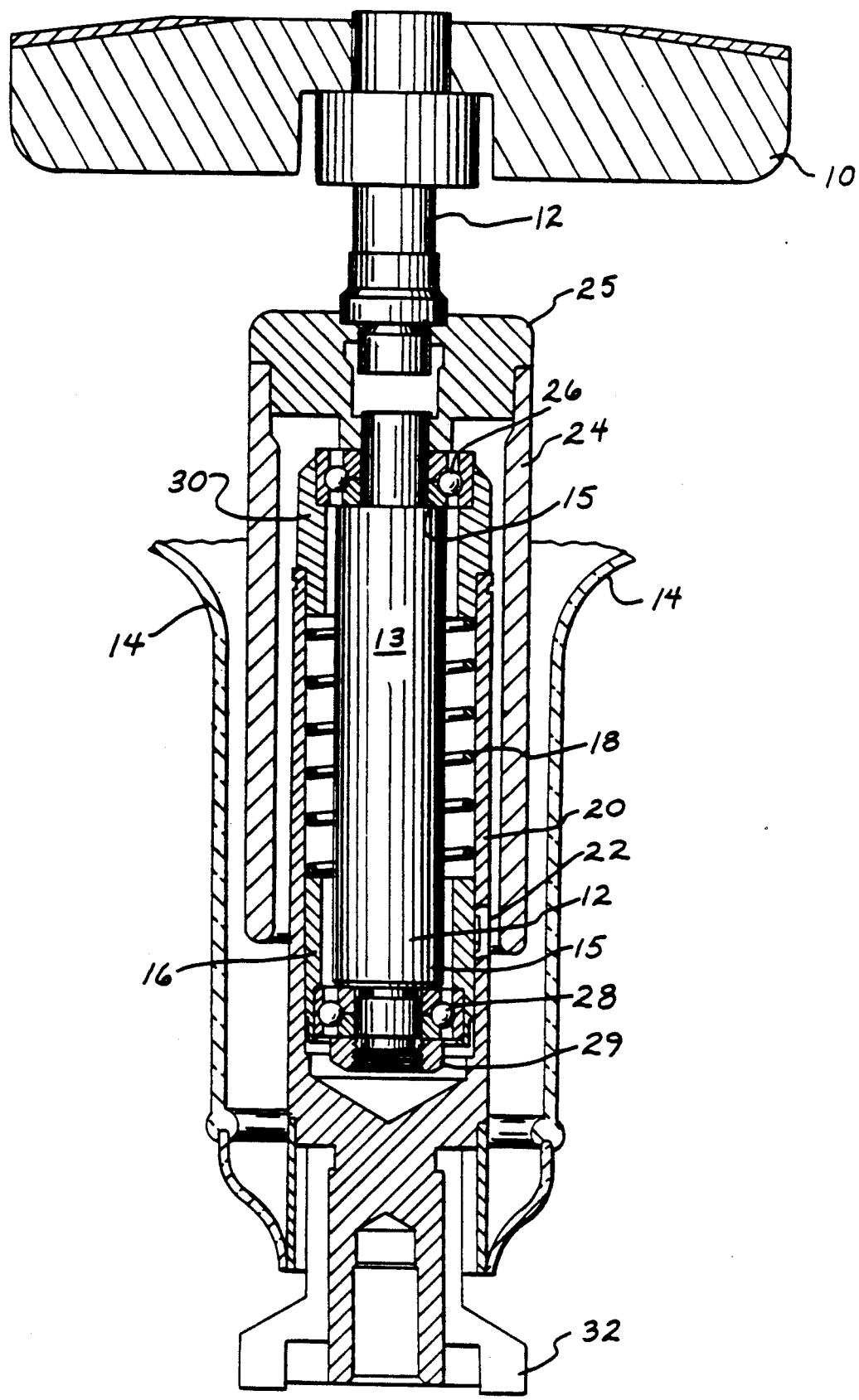
FIG. 1 is a fragmentary view of an X-ray tube showing a partial sectional view of the anode support structure including the bearing retainers.

Referring to FIG. 1, a disk shaped anode 10 is affixed at its axis to the front end of anode shaft 12 so as to rotate with rotation of anode shaft 12. The rear end of anode shaft 12 is received within rotor sleeve collar 25 which in turn supports a copper rotor sleeve 24, to be described below, and a bearing shaft 13 which extends rearward from the collar 25 in alignment with the anode shaft 12.

A front bearing 26 supports the front end of the bearing shaft 13 and has its inner race 46 captured between the rear surface of the rotor sleeve collar 25 and the front surface of a bearing shaft front lip 15 on the bearing shaft 13. A rear bearing 28 supports the rear end of the bearing shaft 13 and has its inner race 46 captured between the rear surface of bearing shaft rear lip 17 at the rear of the bearing shaft 13 and the front surface of rear bearing nut 29 which is threaded on to the rear end of bearing shaft 13.

Surrounding bearing shaft 13 is a copper alloy tubular anode stem 20. Affixed to the front end of the anode stem 20 is front bearing retainer 30 which in turn holds the outer race 50 of front bearing 26 coaxially with the anode stem 20. Slidably fitting within the rear end of anode stem 20 is a rear bearing retainer 16 holding the outer race 50 of rear bearing 28 coaxially within the anode stem 20.

A molybdenum preload spring 18 coaxially surrounds the bearing shaft 13 within the anode stem 20 so as to exert an axial outward force on the front and rear bearing retainers 30 and 16. Rear bearing retainer 16 slides axially within the anode stem 20 to take up axial play between the inner and outer races of the front and rear bearings 26 and 28 under this preload force.

Figure 2:
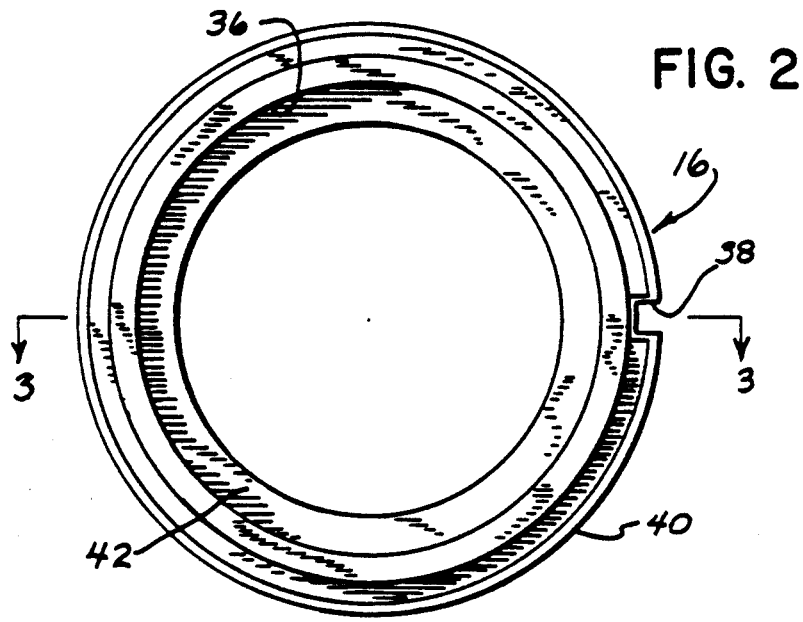
FIG. 2 is an end view of the rear bearing retainer used in the X-ray tube of FIG. 1.

Referring to FIG. 2, rear bearing retainer 16 includes a keyway 38 cut axially in its outer surface. An anti-rotation screw 22, shown in FIG. 1, engages the keyway 38 thereby preventing the rear bearing retainer 16 from rotating with respect to the anode stem 20.

Referring again to FIG. 1, the front bearing 26 and the front bearing retainer 30 and the front portion of the anode stem 20 are coaxially surrounded by a cylindrical, tubular copper rotor sleeve 24, which as mentioned is attached to the anode shaft 12 and hence the bearing shaft 13 by the sleeve collar 25 so as to rotate with the anode 10. The copper rotor sleeve 24 serves as an armature for an induction motor (not shown) which provides torque to spin the anode shaft 12 during operation of the X-ray tube.

The above described anode assembly is contained in a glass envelope 14 which may be evacuated to $10^{-9}$ torr. Directed toward the front surface of the anode 10 and also within the glass envelope 14 is a cathode (not shown) which emits a stream of high energy electrons toward the face of the spinning anode 10 as is understood in the art.

Figure 3:
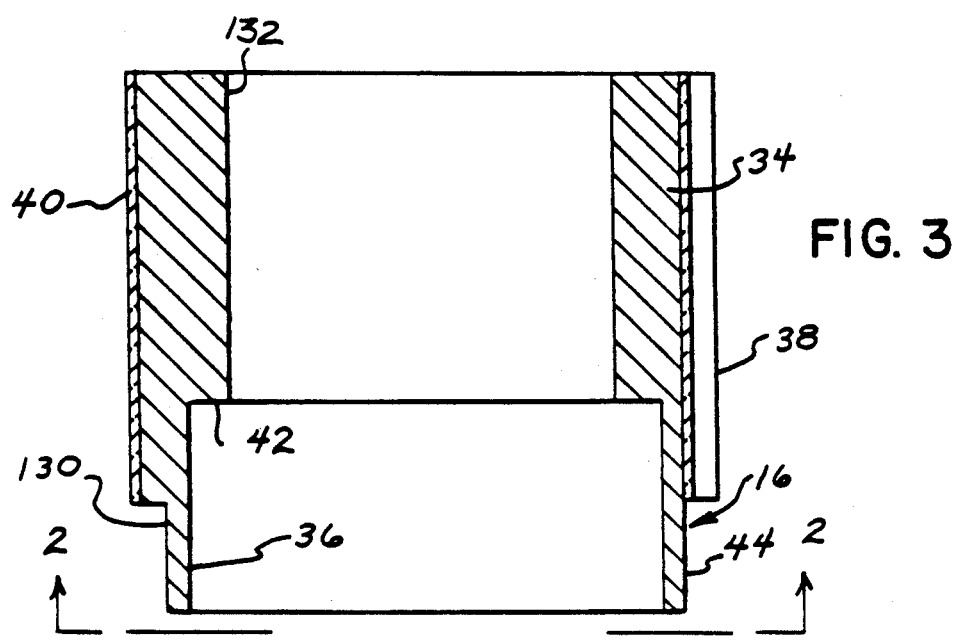
FIG. 3 is a sectional view of the retainer of FIG. taken along lines 3—3 of FIG. 2.

Referring generally to FIG. 2 and 3, the rear bearing retainer 16 is comprised of a cylindrical retainer substrate 34 of 304 LSS stainless steel specified by the following weight percentages: 18 Cr, 8 Ni, 1 Si (max.), 1 Mn, 0.08 C (max), balance Fe. The retainer 16 is machined to tolerance of 0.0005 inches on its outside diameter.

The outer surface of the retainer substrate 34 is coated with a 3-7 μm coating of titanium carbide ("TiC") as will be described further below. The retainer 16 is axially drilled to provide a substrate inner surface 132 and the rear of retainer 16 is counter-bored to the outside diameter of the rear bearing 28 so as to form a bearing retaining sleeve 36 and radial bearing stop 42 to receive the outer race 50 of the rear bearing 28 as shown in FIG. 4.

Referring again to FIG. 3, the rear end of the bearing sleeve 130 is of reduced outside diameter to form a bearing retainer flange 44. The bearing retainer flange 44 does not contact the anode stem 20 when the bearing retainer 16 is assembled in the X-ray tube. The outer surface of the bearing retainer flange 44 is not coated with TiC.

Figure 4:
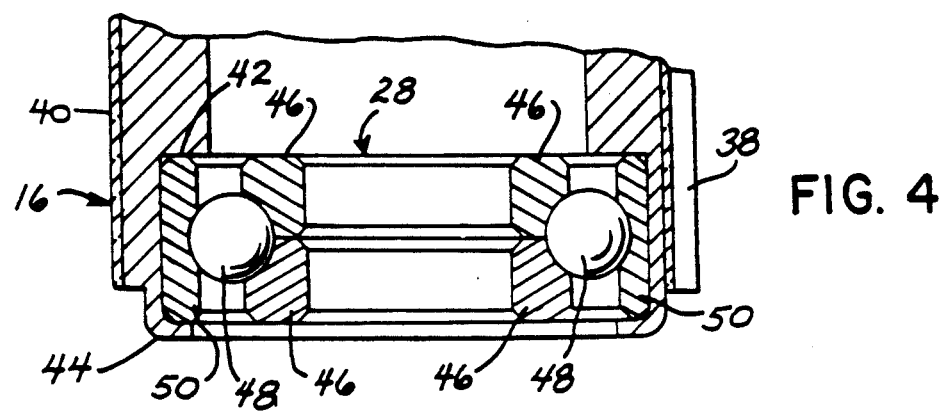
FIG. 4 is a section view of the rear bearing retainer similar to that of FIG. 3 showing the placement of the bearing within the bearing retainer and the swaging of the bearing retainer flange.

Referring to FIG. 4, the rear bearing 28 is inserted axially into the bearing retainer sleeve 36 whereupon the bearing retainer flange 44 is swaged around the rear radial face of the outer race 50 of the rear bearing 28 capturing the outer race 50 between a front face of the bearing retainer flange 44 and the rear face of the bearing stop 42.

LUBRICANT COATING EQUIPMENT

Figure 5:
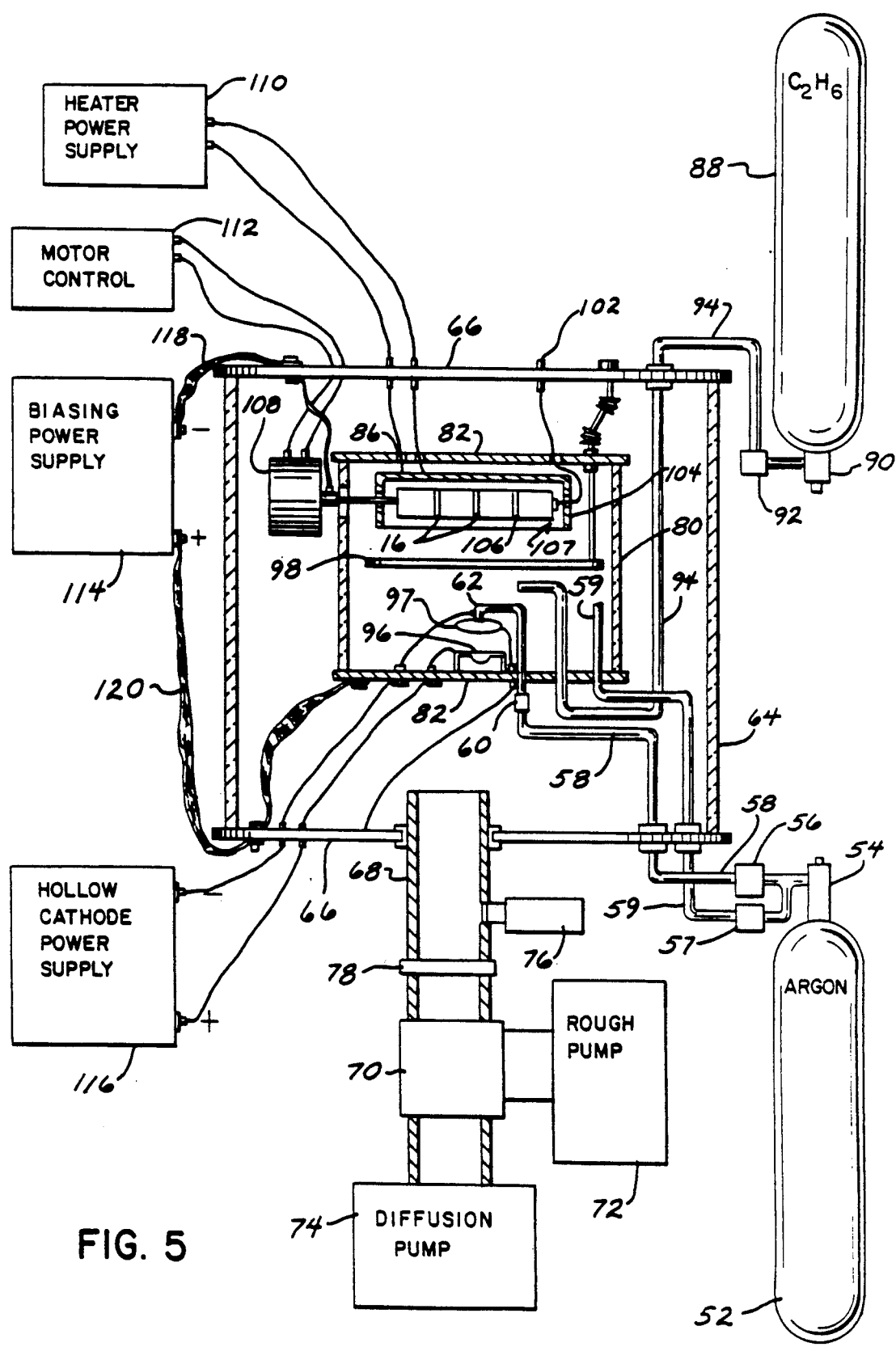
FIG. 5 is a representational block diagram of a plasma assisted physical vapor deposition system suitable for practice of the present invention;.

Referring to FIG. 5, a lubricant coating system suitable for use with the present invention is comprised of a vacuum chamber 64 which is sealed by removable endplates 66 to withstand evacuation to a pressure of $10^{-7}$ torr. Mechanical shafts, electrical wires and piping, to be described below, pass through the endplates 66 by means of gas tight fittings understood in the art. The lowermost endplate 19 admits a vacuum pump throat 68 which, by means of diverter valve 70, alternately connects to a rough pump 72 or to a diffusion pump 74. The rough pump 72 is mechanical rotary pump and performs the initial evacuation of the quartz vaCuum chamber 64 from atmospheric pressure. The diffusion pump 74 incorporating a cold trap (not shown) provides the final evacuation required to achieve a hard vacuum of approximately $10^{-7}$ torr Attached to and communicating with the inside of the vacuum pump throat 68 is an ion vacuum gauge 76 which provides a measure of the pressures within the quartz vacuum cylinder 64. Interposed within the vacuum pump throat between the diverter valve and the lower endplate 66 is a flow throttle 78 whose operation will be described below.

Suspended within the vacuum chamber 64 is a plasma containment chamber 80 also with removable upper and lower endplates 82. The plasma containment chamber 80 is not gas-tight. When assembled with its endplates 82, gases inside the plasma chamber 80 may communicate with gases outside the plasma chamber 80 and within the vacuum chamber 64 by means of ports 86. Accordingly, gaseous argon, admitted by tube 59 though the lower endplate 82 of the plasma chamber 80, flows generally from the bottom to the top of the plasma chamber 80 and out into the vacuum chamber 64 through ports 86. Argon tube 59 extends through the bottom vacuum chamber endplate 66 to metering valve 57 to admit pressurized argon from argon cylinder 52. A second stream of argon from argon cylinder 52 is controlled by metering valve 56 and passes through an electrical isolation coupling 60 to feed the hollow cathode 62 which is attached to the negative lead of a hollow cathode power supply 116. The hollow cathode power supply 116 is capable of supplying approximately 380 amps at 40 volts. The hollow cathode 62 generates a stream of electrons which is directed downward toward a titanium hearth 96 which holds a small quantity of titanium. The water cooled copper hearth 96 and its titanium contents are biased electrically by the positive lead of the cathode power supply 116. During operation an electron stream from the hollow cathode 62 impinges on the titanium bringing the titanium to melting temperatures. A D.C. focusing coil 97 is interposed between the hollow cathode 62 and the titanium hearth 97 to focus the electron stream, as is generally understood in the art. The D.C. focusing coil is powered by a D.C. power supply (not shown) capable of producing 90 amps at 4 volts.

An ethane delivery tube 94 is positioned above the hollow cathode 62 to introduce ethane (or another gaseous source of carbon such as methane or acetylene) to the plasma containment chamber 80 as part of the process of forming titanium carbide described below. The ethane delivery tube is connected to an external ethane tank 88 through a metering valve 92.

Above the hollow cathode 62 is a shutter 98 affixed to shaft which extends through the plasma chamber upper endplate 82 and through the vacuum chamber upper endplate 66 and is terminated with knob 100. The rotation of knob 100 serves to swing shutter 98 over or away from titanium hearth 96.

Figure 6:
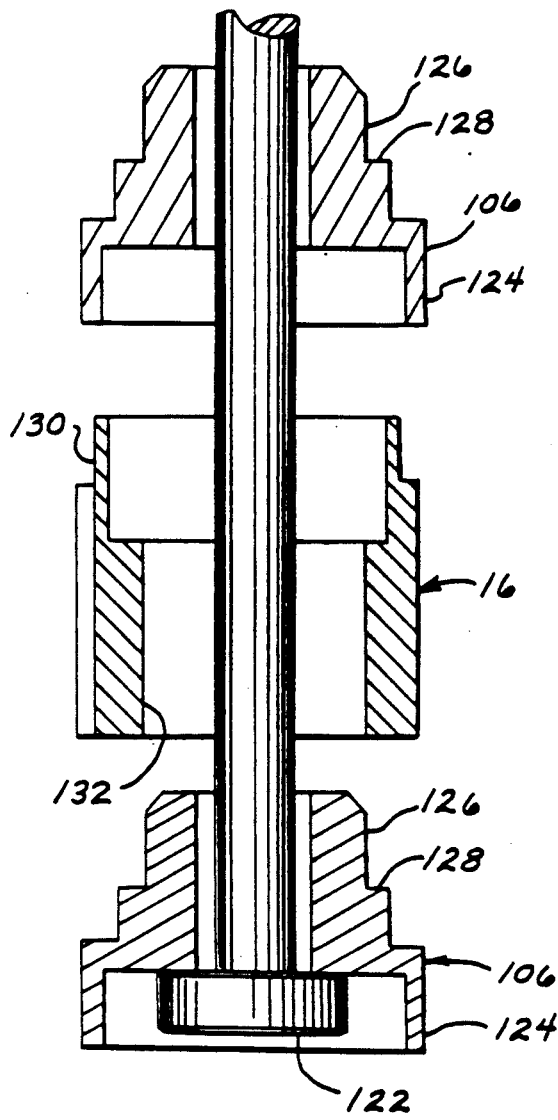
FIG. 6 is an enlarged sectional view of a retainer support assembly used in the system of FIG. 5.

Over the shutter 10 to 12 inches above the titanium hearth 96, and in direct line of sight to the titanium hearth 96 when the shutter 96 is swung away, is retainer support assembly 107. Referring to FIG. 6, retainer support assembly 107 is comprised of a horizontal motor shaft 122 about which retainers 28 are coaxially supported and spaced apart by with retainer supports 106. Retainer supports 106 are constructed of stainless steel and include on one end a cylindrical retainer alignment plug 126 which is slidably received by the substrate inner diameter 132 and a radial retainer stop which limits the depth to which the retainer alignment plug 126 may be inserted into the substrate inner diameter 132. The other end of the retainer support incorporates a flange mask 124 which may fit over the bearing sleeve outer diameter 130 to support and mask the bearing retainer flange 44 from being coated with TiC. Accordingly two retainer supports 106 serve to support both ends of a rear bearing retainer 16.

During the coating operation, rear bearing retainers 16 are stacked alternately with retainer supports 106 so that each bearing retainer 16 is supported on the motor shaft and masked as described above.

Referring again to FIG. 5, retainer support assembly 107 is rotated by the motor shaft 122 at approximately 50 revolutions per minute and oscillated back and forth axially at approximately 6 cm per minute to aid in the coating process. This motion is accomplished by means of oscillator motor 108 controlled by motor controller 112.

A heater 104 surrounds all but the lower side of the retainer support assembly 107 to heat the rear bearing retainers 16 as required during the coating process. The heater 104 is an electrical resistance type powered by heater power supply 110. A thermocouple 102 is held in proximity to the rear bearing retainers 16 to provide temperature readings during the coating process.

The retainer support assembly 107 is also attached to the negative voltage lead of a biasing voltage power supply 114. The positive lead of this biasing power supply 114 is connected to the titanium hearth 96.

Ion plating equipment of this type and suitable for the practice of this invention may be purchased from the ULVAC North America Corporation, Kennebunk, Me.

COATING PROCESS

Figure 7:
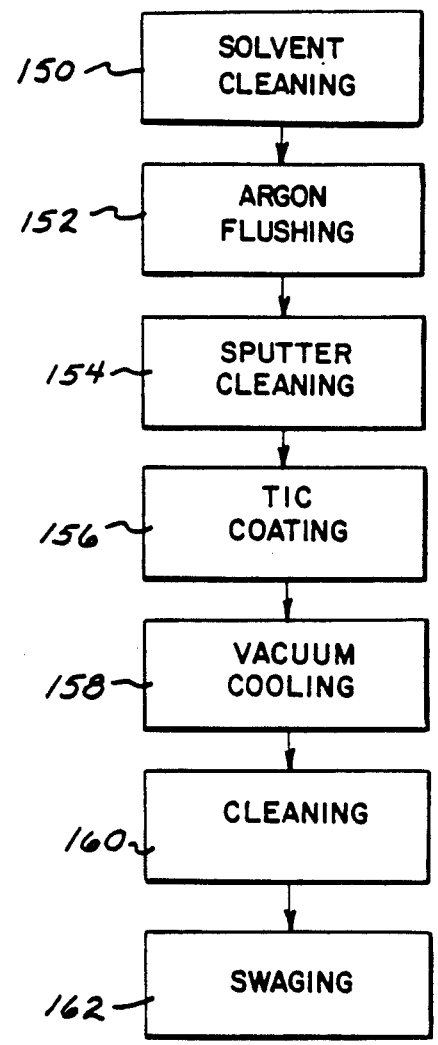
FIG. 7 is a flow chart of the plasma assisted physical vapor deposition process practiced in the present invention.

Referring to FIG. 7, as indicated in process block 150, the rear bearing retainers 16 are first solvent cleaned in successive ultrasonically agitated baths of alcohol and methylene chloride to remove the machining oil and grease. The retainers are air dried and assembled on the motor shaft 122 with the retainer supports 106 within the plasma chamber 80.

The vacuum chamber 64 and plasma chamber 80 are then evacuated to $10^{-7}$ torr, filled with high purity argon to atmospheric pressure, and then evacuated again to $10^{-7}$ torr as indicated in process block 152. The purpose of this procedure is to eliminate, to the extent feasible, stray gas molecules such as nitrogen and oxygen which could combine with the titanium to form nitrides or oxides.

The motor controller 112 is activated to reciprocate and rotate the retainer support assembly 107, through oscillator motor 108, to provide uniform processing of the retainers 16 during the sputter cleaning process, indicated by process block 154. During the sputter cleaning process, high purity gaseous argon is introduced to the plasma chamber 80 raising the pressure to approximately $10^{-4}$ torr. The flow throttle 56 in the vacuum pump throat 54 prevents saturation of the diffusion pump with the introduced argon stream and introduction of an ethane stream to be described below.

The biasing power supply 114 is set to a voltage of approximately 500 volts creating a biasing electric field between the chamber endplate 82 and the retainer support assembly. Argon atoms flowing within this field are ionized and the resulting charged argon ions are accelerated by the electric field toward the bearing retainers 16 striking them and cleaning impurities from their surface. This sputter cleaning process, indicated by process block 154, is continued for approximately 15 minutes. During the sputter cleaning process 154, the hollow cathode power supply 116 is off and therefore the titanium is in solid state.

During the final stages of the sputter cleaning process 154, the heater 104 is activated bringing the temperature of the bearing retainers 16 to approximately 450° C.

The coating process, indicated by process block 156 is initiated by raising the voltage of the hollow cathode power supply 114 to approximately 40 volts so that the stream of electrons flowing thorough the hollow cathode 62 is accelerated toward the titanium hearth 82. The resulting electron stream is focused by focusing coil 97 to impinge upon the titanium within the titanium hearth 82 bringing the titanium rapidly to its melting point of 1670° C. Titanium atoms freed from the surface of the titanium in the hearth 82 are ionized and accelerated toward the bearing retainers 16 by the biasing voltage between the chamber endplate 82 and the retainers 16.

Ethane is concurrently introduced into the plasma containment chamber 80 from ethane delivery tube 94 at approximately 180 cm³/minute. The ethane is decomposed within the plasma producing carbon which reacts with the titanium to form titanium carbide which is deposited on the outer surfaces of the bearing retainer assembly 107 and hence the retainers 16. The pressure in the vacuum chamber 64 is maintained between $10^{-4}$ and $10^{-2}$ torr. Other gases than ethane, such as methane or acetylene, may be substituted as the source of carbon for the synthesis of TiC in this application as will be apparent to one skilled in the art.

The voltage of the biasing power supply 114 is decreased during this coating process to 100 volts. The heater 104 is adjusted to maintain approximately 450° C.

The coating process 156 is continued for approximately one hour at which time a TiC layer of approximately 5 μm has been applied to the outer surfaces of the bearing retainers 16. At this time the biasing power supply 114 and hollow cathode power supply 116 are turned off. The ethane flow is continued for approximately 3 minutes to ensure that all free titanium atoms have combined with carbon from the ethane and then the ethane and argon flows are shut off and the vacuum vessel 64 is pumped down to $10^{-7}$ torr while the retainers 16 cool to room temperature.

Once cool the retainers are removed from the retainer support assembly and ultrasonically cleaned.

Bearing 28 may then be fitted into the bearing sleeve 36 of each retainer 16 and the bearing retainer flange 44 may be swaged around the outer bearing race 50 as has been previously described. The combined rear bearing retainer 16 and the rear bearing 28 may then be assembled into the anode stem as described above.

A preferred embodiment of the invention has been described, but it should be apparent to those skilled in the art that many variations can be made without departing from the spirit of the invention. For example a sliding retainer may be used with the front bearing alone or in addition to the sliding retainer holding the rear bearing. Also, other metals in Group 4 of the periodic chart may be substituted for titanium, such as hafnium or zirconium. Also, the inner surface of the anode stem may be similarly coated with a lubricating ceramic material to reduce wear between the retainer and the anode stem. Other bearing components, such as the bearing balls and races may be similarly coated with the materials described.

I claim:

1. A method of producing a lubricated bearing retainer assembly for use in an x-ray tube comprised of a bearing sleeve supporting an outer retainer substrate and a bearing fitted within the bearing sleeve, comprising the steps of:
   removing contaminants from the bearing substrate surfaces;
   heating the bearing retainer to substantially 450° C.;
   depositing a ceramic layer on the outer surfaces of the retainer substrate by plasma assisted physical vapor deposition under a biasing field in a low pressure environment where the biasing voltage is substantially 100 volts and the pressure is maintained between $10^{-4}$ and $10^{-2}$ torr.

2. The method of claim 1 wherein the bearing sleeve includes a flange means and including the steps of:
   masking the flange means prior to the deposition of the ceramic layer;
   inserting the bearing in the bearing sleeve; and
   deforming the masked flange means around the bearing to hold the bearing within the bearing sleeve.

3. A method of producing a lubricated bearing retainer assembly for use in an x-ray tube having a bearing sleeve supporting an outer retainer substrate and a bearing fitted within the bearing sleeve, comprising the steps of:
   masking the flange means prior to the deposition of the ceramic layer;
   depositing a ceramic layer on the outer surfaces of the retainer substrate by plasma assisted physical vapor deposition under a biasing field in a low pressure environment where the biasing voltage is substantially 100 volts and the pressure is maintained between $10^{-4}$ and $10^{-2}$ torr;
   inserting the bearing in the bearing sleeve; and
   deforming the masked flange means around the bearing to hold the bearing within the bearing sleeve.

* * * * *

UNITED STATES PATENT AND TRADEMARK OFFICE
CERTIFICATE OF CORRECTION

PATENT NO. : 4,988,534
DATED : January 29, 1991
INVENTOR(S) : Kamleshwar Upadhya It is certified that error appears in the above-identified patent and that said Letters Patent is hereby corrected as shown below:

Column 1, Line 24, change "3200 °C.," to --3200 °C,--

Column 1, Line 30, change "or" to "on"

Column 2, Line 12, change "inventiOn" to "invention"

Column 2, Line 58, change "FIG. taken" to "FIG. 2 taken"

Column 4, Line 37, change "vaCuum" to "vacuum"

Column 4, Line 41 add a "period (.)" to the end of the word "torr"

Column 8, Line 9, change "450°C.; depositing" to "450°C; and, depositing"

Signed and Sealed this

Eighth Day of September, 1992

*Attest:*

DOUGLAS B. COMER

*Attesting Officer*     *Acting Commissioner of Patents and Trademarks*